(12) United States Patent
Lee

(10) Patent No.: US 9,328,907 B2
(45) Date of Patent: May 3, 2016

(54) INTELLECTUAL LIGHT UNIT

(71) Applicant: Wen-Sung Lee, Taichung (TW)

(72) Inventor: Wen-Sung Lee, Taichung (TW)

(*) Notice: Subject to any disclaimer, the term of this patent is extended or adjusted under 35 U.S.C. 154(b) by 15 days.

(21) Appl. No.: 14/452,542

(22) Filed: Aug. 6, 2014

(65) Prior Publication Data

US 2016/0040865 A1    Feb. 11, 2016

(51) Int. Cl.
*B62J 6/00* (2006.01)
*F21V 23/04* (2006.01)
*B62J 6/16* (2006.01)
*B62J 6/02* (2006.01)
*F21Y 101/02* (2006.01)
*F21W 101/023* (2006.01)

(52) U.S. Cl.
CPC .............. *F21V 23/0464* (2013.01); *B62J 6/02* (2013.01); *B62J 6/16* (2013.01); *F21W 2101/023* (2013.01); *F21Y 2101/02* (2013.01)

(58) Field of Classification Search
CPC . F21V 23/0464; B62J 6/16; F21W 2101/023; F21Y 2101/023
See application file for complete search history.

(56) References Cited

U.S. PATENT DOCUMENTS

2011/0074737 A1* 3/2011 Hsieh ................. G06F 3/0416
                                                                 345/175
2014/0211500 A1* 7/2014 Min ................... H01L 25/0753
                                                                 362/606

* cited by examiner

*Primary Examiner* — Thomas M Sember

(57) ABSTRACT

A light unit includes a light transmitting portion and a body. A detecting member and a light source unit are located in the light transmitting portion. The detecting member detects the environment brightness and the light source unit emits light to compensate light difference between the expected brightness and the environment brightness. A control member is located in the body and electrically connected with the detecting member and the light source unit. The control member includes a signal magnifying unit, a switching unit and a control unit. The signal magnifying unit receives and magnifies the light signal from the detecting member, and the switching unit switches the light signal from analog signal into digital signal and sends the digital signal to the control unit. The control unit controls the light source to compensate the light difference between the expected brightness and the environment brightness.

4 Claims, 4 Drawing Sheets

INTELLECTUAL LIGHT UNIT

BACKGROUND OF THE INVENTION

1. Field of the Invention

The present invention relates to a light unit, and more particularly to an intellectual vehicle light unit which compensates the light difference of the environmental light and saves electric energy.

2. Description of Related Art

A light unit used on a bicycle is designed to protect the rider from being hit by vehicles because of low visibility, especially in dark area. The conventional light unit generally is powered by batteries which provide limited power to the light unit and most of the batteries contain material that is harmful to the environment. In order to replace the batteries, green energy is developed such as solar energy or wind energy. However, these green energies require expensive cost and huge equipment, and the natural energy is not stable.

A conventional light unit known to applicant is automatically activated when the environment is dark, and is stopped when the environment has sufficient light. The light unit uses at least one Light Emitting Diode (LED) cooperated with a driving circuit to activate the LED to flash. The LED is electrically connected between the output end of the circuit and a CDS which is connected to a contact point of a spring switch. The spring switch is connected with a resistance and is grounded. The CDS detects the environment light and the spring switch is activated by the vibration of the bicycle.

However, the so called environment light that is detected by the CDS actually is the combination of the environment light and the light from the light unit itself. Therefore, the light unit cannot provide precise light to compensate the difference between the real environment light and the expected illumination feature. Besides, more electric energy is required.

The present invention has arisen to mitigate and/or obviate the disadvantages of the conventional light unit.

SUMMARY OF THE INVENTION

The main objective of the present invention is to provide a light unit and comprises a light transmitting portion on the first end of the light unit, and a body is connected to the second end of the light unit. A detecting member and a light source unit are located in the light transmitting portion. The detecting member detects the environment brightness, and the light source unit emits light to compensate light difference between the expected brightness and the environment brightness. A control member is located in the body and electrically connected with the detecting member and the light source unit. The control member has a signal magnifying unit, a switching unit and a control unit. The signal magnifying unit receives and magnifies the light signal from the detecting member. The switching unit switches the light signal from analog signal into digital signal and sends the digital signal to the control unit. The control unit controls the light source unit to operate, the control unit also controls the timing and sequence of the detecting member to detect the environment brightness.

When the light source unit is operated to compensate the light difference between the expected brightness and the environment brightness, the detecting member stops to detect the environment brightness. When the detecting member detects light gaps formed by the light source unit, the light source unit emits light to compensate the difference between the expected brightness and the environment brightness.

Preferably, the light source unit comprises a reflection member and an illumination member. The reflection member is a cup-like member and the illumination member is located within the refection member and faces an opening of the reflection member. The illumination member emits light rays, the light rays partially go through the light transmitting portion and partially are reflected by the reflection member and pass through the light transmitting portion.

Preferably, the control member comprises a buffering unit which controls the control unit to change or maintains the illumination member at current status.

Preferably, the control member comprises an adjustment unit which electrically connected with the control unit. The adjustment unit manually adjusts the illumination member.

Preferably, a power generation hub is electrically connected with the control unit. The power generation hub is connected to a bicycle rim and generates electric power which is delivered to the light source unit via the control unit.

Further benefits and advantages of the present invention will become apparent after a careful reading of the detailed description with appropriate reference to the accompanying drawings.

DETAILED DESCRIPTION OF THE INVENTION

Figure 1:
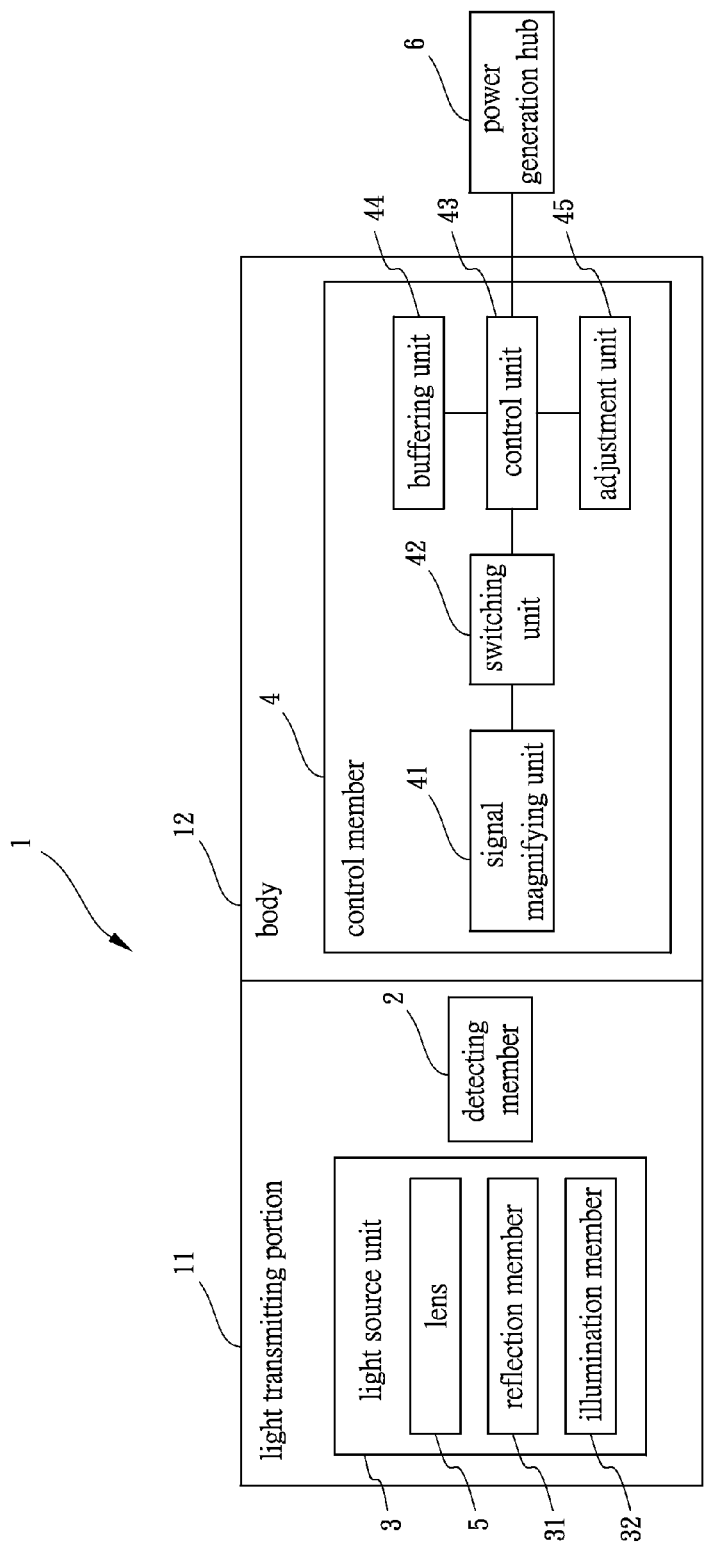
FIG. 1 shows the block diagram of the light unit of the present invention.
Figure 2:
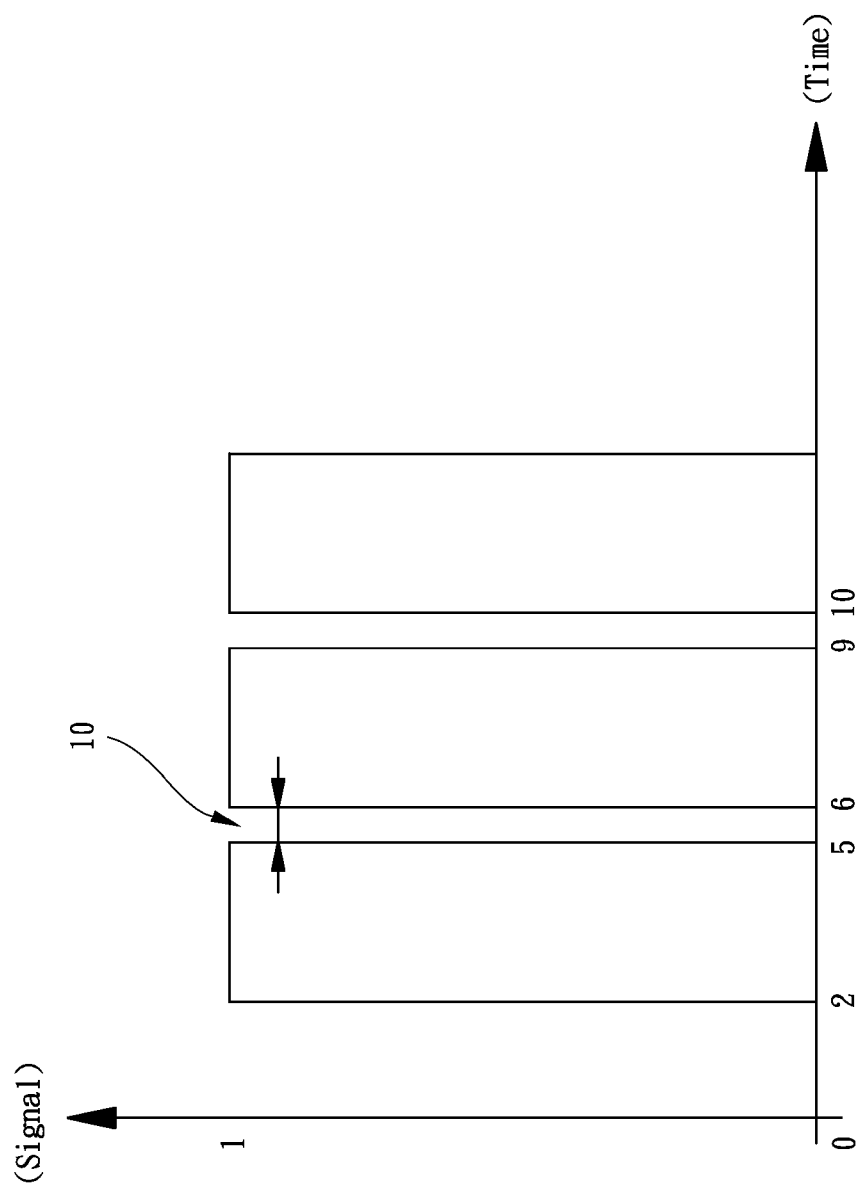
FIG. 2 shows the relationship between the signal and time of the light waves of the light source unit and the detecting member of the light unit of the present invention.
Figure 3:
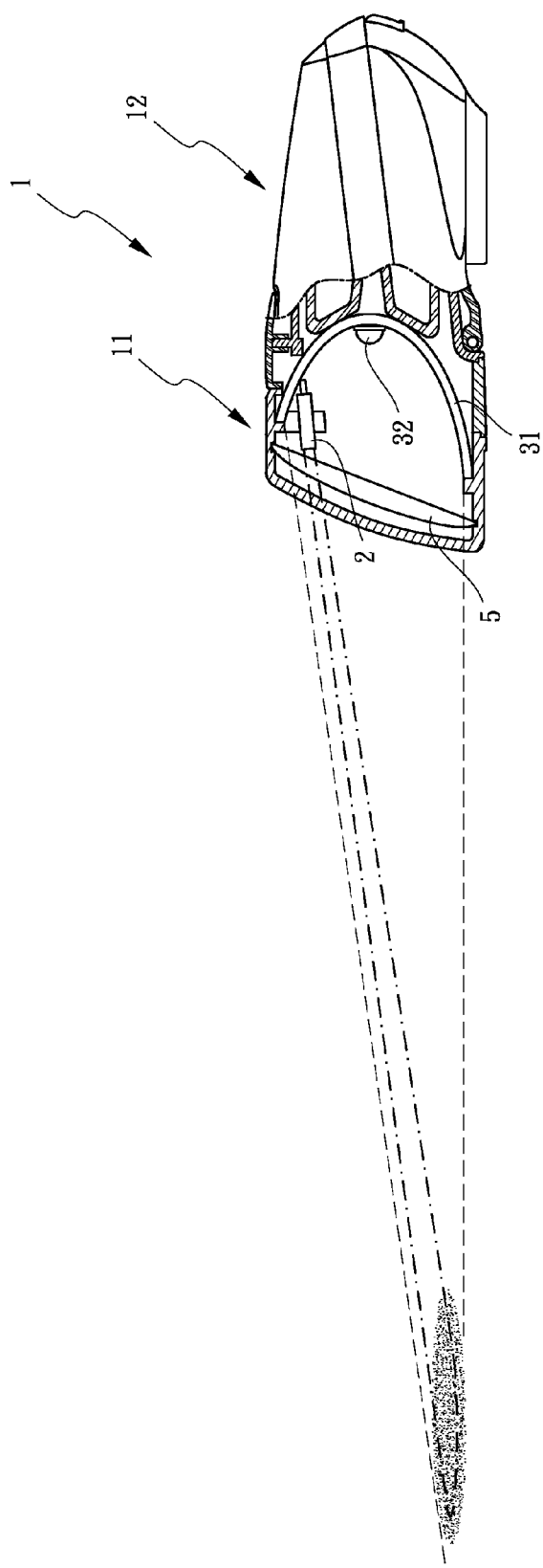
FIG. 3 is a partial cross sectional view of the light unit of the present invention.

Referring to the drawings and initially to FIGS. 1 to 3, the light unit 1 in accordance with the present invention comprises a light transmitting portion 11 on the first end of the light unit 1, and a body 12 connected to the second end of the light unit 1. A detecting member 2 and a light source unit 3 are located in the light transmitting portion 11. The detecting member 2 detects the environment brightness, and the light source unit 3 emits light to compensate light difference between the n expected brightness and the environment brightness.

The light source unit 3 comprises a reflection member 31 and an illumination member 32. The reflection member 31 is a cup-like member and the illumination member 32 is located within the refection member 31 and faces an opening of the reflection member 31. The illumination member 32 emits light rays, the light rays partially go through the light transmitting portion 11 and partially are reflected by the reflection member 31 and pass through the light transmitting portion 11.

A control member 4 is located in the body 12 and electrically connected with the detecting member 2 and the light source unit 3. The control member 4 comprises a signal magnifying unit 41, a switching unit 42 and a control unit 43. The signal magnifying unit 41 receives and magnifies a light signal from the detecting member 2, and the switching unit 42 switches/transforms the light signal from analog signal into digital signal, and sends the digital signal to the control unit 43. The control unit 43 is receives the digital signal and controls the light source unit 3 to operate with proper time and brightness. The control unit 43 controls the timing and the sequence of the detecting member 2 to detect the environment brightness.

When the light source unit 3 is operated to compensate the light difference between the expected brightness and the environment brightness, the detecting member 2 stops to detect the environment brightness. When the detecting member 2 detects light gaps 10 formed by the light source unit 3, the light source unit 3 emits light to compensate the difference between the expected brightness and the environment brightness. By this way, the electric power can be saved while the illumination and brightness are properly supplied.

When the rider rides a bicycle with the light unit of the present invention at a dark area, the detecting member 2 detects the environment brightness, and sends the light signal to the control member 4. The signal magnifying unit 41 receives and magnifies the light signal from the detecting member 2, and the switching unit 42 switches/transforms the light signal from analog signal into digital signal which allows the control unit 43 to calculate, judge and analyze the light signal and to control the light source unit 3 to operate with precise time and brightness. The control unit 43 controls the timing and the sequence of the detecting member 2 to detect the environment brightness. During the operation of the light source unit 3, when the detecting member 2 detects light gaps 10 which cannot be seen by human eyes, formed by the light source unit 3, the light source unit 3 emits light to compensate the difference between the expected brightness and the environment brightness.

As shown in FIG. 2, as a reference, the X-axis represents time and the Y-axis represents signal, when the time is 2-5, the signal on the Y-axis is maintained at 1, this area is called the first block. At the time becomes 5-6, the signal drops to zero. When the time increases to 6-9, the signal on the Y-axis is suddenly activated and maintains at the constant value 1, this area is called the second block. There is a light gap 10 formed between the first and second blocks. The detecting member 2 stops to detect when the light source unit 3 is in operation, because the illumination from the light source unit 3 and the environment brightness confuse the detecting member 2, so that the present invention sets the detecting member 2 to be activated only when the light gaps 10 are detected. This reduces the errors of the detecting member 3 and prolongs the life of the light source unit 3.

As shown in FIG. 3, the reflection member 31 includes an upper opening and a lower opening, the illumination member 32 is located within the lower opening A lens 5 is installed corresponding to the upper opening of the reflection member 31. By this arrangement, the light rays from the illumination member 32 partially go through the lens 5 and partially are reflected by the reflection member 31 and pass through the lens 5.

The environment brightness or light changes continuously, therefore, the control member 4 comprises a buffering unit 44 which controls the control unit 43 to change or maintains the illumination member 32 at current status according to the changes of the environment brightness or light. By this way, the light unit 1 of the present invention provides sufficient illumination and the light source unit 3 emits light to compensate light difference between the expected brightness and the environment brightness when light gaps 10 are formed.

The control member 4 further comprises an adjustment unit 45 which electrically connected with the control unit 43. The adjustment unit 45 allows the user to manually adjust the operation of the control unit 43, the light source unit 3 and the detecting member 2 so as to control the illumination member 32.

Figure 4:
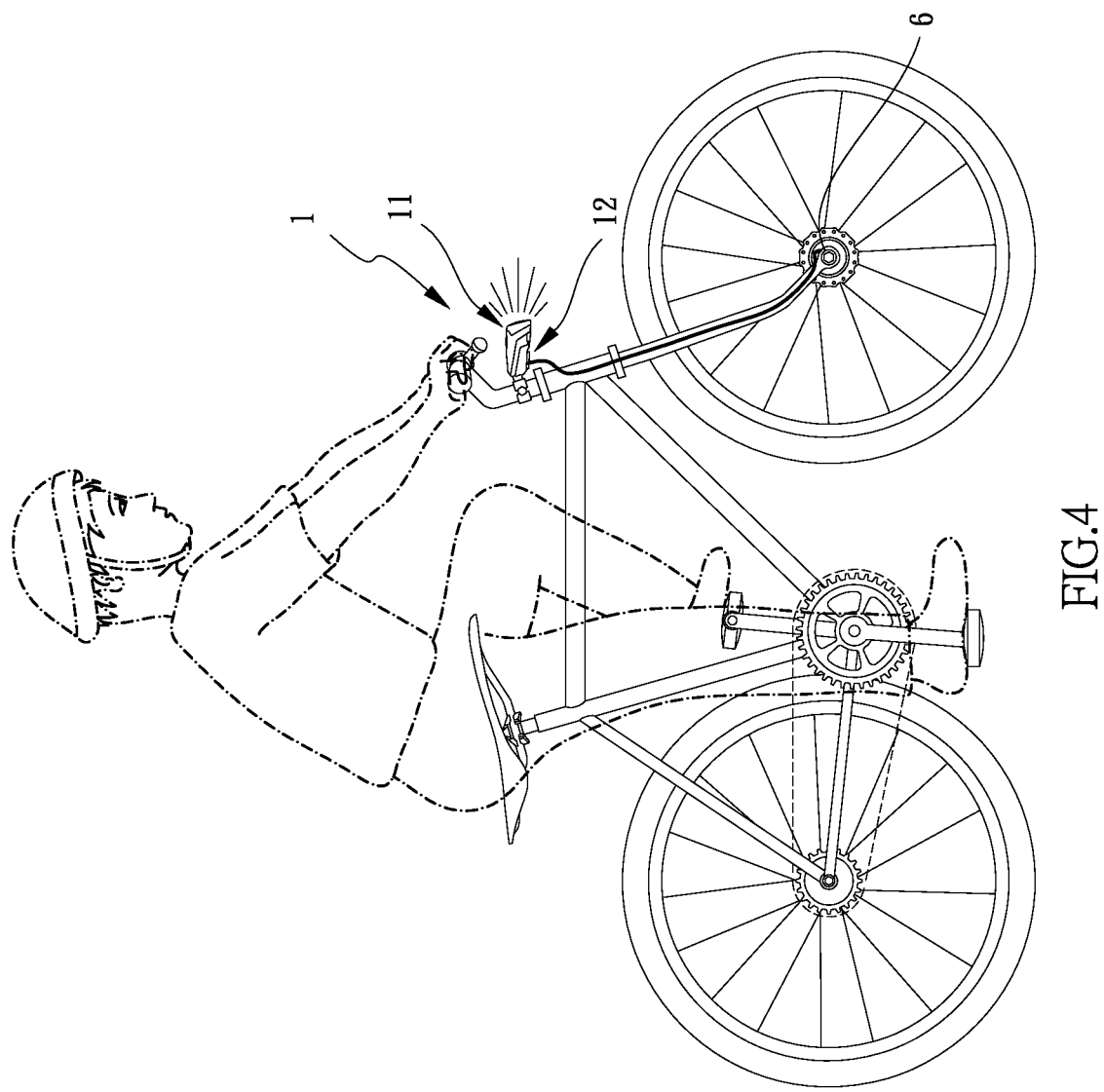
FIG. 4 shows that the light unit of the present invention is cooperated with a power generation hub on a bicycle.

As shown in FIG. 4, a power generation hub 6 is electrically connected with the control unit 43 and installed to a bicycle rim. When the rim is operated to rotate, the power generation hub 6 generates electric power which is delivered to the light source unit 3 via the control unit 43. The power generation hub 6 is a well know prior art.

The detecting member 2 is only activated when there are light gaps 10 formed, so that the light source unit 3 is ensured to maintain the sufficient illumination and brightness.

Although the invention has been explained in relation to its preferred embodiment, it is to be understood that many other possible modifications and variations can be made without departing from the spirit and scope of the invention as hereinafter claimed.

What is claimed is:

1. A vehicle light unit comprising:
a light transmitting portion on a first end of the light unit, a body connected to a second end of the light unit;
a detecting member and a light source unit located in the light transmitting portion, the detecting member detecting environment brightness, the light source unit emitting light to compensate light difference between an expected brightness and the environment brightness;
a control member located in the body and electrically connected with the detecting member and the light source unit, the control member having a signal magnifying unit, a switching unit and a control unit, the signal magnifying unit receiving and magnifying a light signal from the detecting member, the switching unit switching the light signal from analog signal into digital signal and sending the digital signal to the control unit, the control unit controlling the light source unit to operate, the control unit controlling timing and sequence of the detecting member to detect the environment brightness, when the light source unit is operated to compensate the light difference between the expected brightness and the environment brightness, the detecting member stops to detect the environment brightness, when the detecting member detects light gaps formed by the light source unit, the light source unit emits light to compensate the difference between the expected brightness and the environment brightness; and
a power generation hub which is electrically connected with the control unit, the power generation hub connected to a bicycle rim and generates electric power which is delivered to the light source unit via the control unit.

2. The vehicle light unit as claimed in claim 1, wherein the light source unit comprises a reflection member and an illumination member, the reflection member is a cup-like member and the illumination member is located within the refection member and faces an opening of the reflection member, the illumination member emits light rays, the light rays partially go through the light transmitting portion and partially are reflected by the reflection member and pass through the light transmitting portion.

3. The vehicle light unit as claimed in claim 1, wherein the control member comprises a buffering unit which controls the control unit to change or maintains the illumination member at current status.

4. The vehicle light unit as claimed in claim 1, wherein the control member comprises an adjustment unit which electrically connected with the control unit, the adjustment unit is adapted to allow a user to manually adjust the illumination member.

* * * * *